United States Patent
Howard et al.

(10) Patent No.: US 10,323,959 B2
(45) Date of Patent: Jun. 18, 2019

(54) INDUCTIVE POSITION DETECTOR

(71) Applicants: Mark Anthony Howard, Worlington (GB); Darran Kreit, Cambridge (GB)

(72) Inventors: Mark Anthony Howard, Worlington (GB); Darran Kreit, Cambridge (GB)

(73) Assignee: ZETTLEX (UK) LIMITED, Cambridgeshire (GB)

( * ) Notice: Subject to any disclaimer, the term of this patent is extended or adjusted under 35 U.S.C. 154(b) by 54 days.

(21) Appl. No.: 15/528,570

(22) PCT Filed: Jan. 29, 2015

(86) PCT No.: PCT/GB2015/050216
§ 371 (c)(1),
(2) Date: May 22, 2017

(87) PCT Pub. No.: WO2016/079465
PCT Pub. Date: May 26, 2016

(65) Prior Publication Data
US 2017/0292858 A1    Oct. 12, 2017

(30) Foreign Application Priority Data

Nov. 22, 2014  (GB) .................................. 1420842.5

(51) Int. Cl.
*G01D 5/20*   (2006.01)
*G01B 7/02*   (2006.01)
*B62D 1/185*  (2006.01)

(52) U.S. Cl.
CPC ........... *G01D 5/2073* (2013.01); *B62D 1/185* (2013.01); *G01B 7/023* (2013.01); *G01D 5/204* (2013.01)

(58) Field of Classification Search
CPC ...... G01D 5/2073; G01D 5/204; G01B 7/023; B62D 1/185
See application file for complete search history.

(56) References Cited

U.S. PATENT DOCUMENTS

| 7,190,158 B2 * | 3/2007 | Tiemann | G01D 5/2053 324/207.17 |
| 8,020,453 B2 * | 9/2011 | Kreit | G01D 5/2073 73/862.331 |

(Continued)

FOREIGN PATENT DOCUMENTS

| GB | 2427481 A | 6/2006 |
| WO | WO2006079793 A1 | 8/2006 |
| WO | WO2009053752 A2 | 4/2009 |

OTHER PUBLICATIONS

International Search Report—PCT/GB2015/050216—International Searching Authority, EPO (dated Jul. 16, 2015).

*Primary Examiner* — Huy Q Phan
*Assistant Examiner* — Zannatul Ferdous
(74) *Attorney, Agent, or Firm* — Muncy, Geissler, Olds & Lowe, P.C.

(57) ABSTRACT

An inductive position detector with a first and second body, at least one of said bodies being displaceable relative to the other along a measurement path wherein said first body comprises one or more antenna windings forming a first arrangement of windings and said second body comprises a passive resonant circuit incorporating one or more target windings in series with a capacitor; said circuit covering at least in part said first arrangement; characterized in that said first body comprises an additional winding arrangement disposed along at least part of said measurement path; said additional winding arrangement being spaced from said first arrangement of windings; and said second body comprises an additional winding arrangement covering at least in part said additional winding arrangement of said first body.

17 Claims, 4 Drawing Sheets

(56) References Cited

U.S. PATENT DOCUMENTS

| | | | |
|---|---|---|---|
| 9,752,899 B2* | 9/2017 | Goto | G01D 5/2258 |
| 2011/0025349 A1* | 2/2011 | Howard | G01D 5/2073 |
| | | | 324/655 |
| 2013/0069637 A1* | 3/2013 | Kobayashi | G01D 5/208 |
| | | | 324/207.17 |
| 2013/0257417 A1* | 10/2013 | Ely | G01D 5/2013 |
| | | | 324/207.22 |
| 2016/0131503 A1* | 5/2016 | Goto | G01D 5/2258 |
| | | | 324/207.17 |
| 2017/0272071 A1* | 9/2017 | Koyuncu | H03K 17/9505 |

* cited by examiner

INDUCTIVE POSITION DETECTOR

CROSS-REFERENCE TO RELATED APPLICATIONS

This application is the U.S. National Stage Entry under 35 U.S.C. § 371 of International Application No. PCT/GB2015/050216, filed on Jan. 29, 2015, which claims priority to GB Patent Application No. 1420842.5, filed on Nov. 22, 2014.

FIELD OF THE INVENTION

This invention relates to an inductive displacement or position detector, operable to measure the displacement of relatively moveable bodies.

REVIEW OF THE ART KNOWN TO THE APPLICANT

The authors have previously disclosed a number of inventions relating to inductive detectors to measure displacement including GB2427481. Generally, such detectors use the principle of mutual inductance whereby one or more transmit windings is energized with an AC signal to generate an AC magnetic field and receive windings are arranged to couple with the transmit windings. The amount of coupling varies as the displacement of a passive inductive target varies relative to the windings. The basic principle is known and has been advantageously used to make detectors based on printed circuit boards which are robust and reliable in hostile environments. However, small imperfections in the windings and their arrangement lead to imperfections or disturbances in the electromagnetic coupling which, in turn, leads to imperfections or non-linearities in the measurement. Such disturbances or non-linearities come from various sources including manufacturing irregularities in the windings, capacitive coupling between the windings, cross-talk between windings, plated via holes between layers etc. Such disturbances are of no consequence for relatively low performance detectors requiring an accuracy of perhaps 1% of full-scale but when accuracies of <<1% are required then they are highly problematic not least because the imperfections are typically small and numerous, thus making them difficult to eradicate through a simple calibration. These small and numerous imperfections or non-linearities typically require calibration with typically >10, often >100 and possibly >1000 correction points along the measurement scale thus making calibration difficult and time consuming.

Embodiments of the invention provide an inductive detector with superior measurement performance.

SUMMARY OF THE INVENTION

In a first broad independent aspect, the invention provides an inductive position detector with a first and a second body, at least one of said bodies being displaceable relative to the other along a measurement path wherein said first body comprises one or more antenna windings forming a first arrangement of windings and said second body comprises a passive resonant circuit incorporating one or more target windings in series with a capacitor; said circuit covering at least in part said first arrangement; characterised in that said first body comprises an additional winding arrangement disposed along at least part of said measurement path; said additional winding arrangement being spaced from said first arrangement of windings; and said second body comprises an additional winding arrangement covering at least in part said additional winding arrangement of said first body.

This configuration is particularly advantageous in preferred embodiments since they allow considerable improvements in the accuracy of the measurement.

Preferably, the additional winding arrangement of said first body and the additional winding arrangement of said second body vary at substantially the same pitch.

Preferably, said additional winding arrangement of said first body comprises a series of loops where adjacent loops have opposite magnetic polarity. This is particularly advantageous in providing a balanced additional winding arrangement.

Preferably, said additional winding arrangement of said second body comprises a series of loops where adjacent loops have opposite magnetic polarity. This is particularly advantageous in providing a balanced additional winding arrangement.

Preferably, said detector comprises a measurement axis; and said additional winding arrangement of said first body forms an additional receiving winding which is separated from said first arrangement in a direction orthogonal to said measurement axis. This configuration is particularly advantageous in providing a secondary winding arrangement in order to optimise the accuracy of the measurements.

Preferably, the detector further comprises a measurement axis; and said additional winding arrangement of said second body is spaced from said circuit in a direction orthogonal to the measurement axis.

Preferably, the additional winding arrangement of said first body incorporates at least a first series of loops and a second series of loops which overlap one another and are shifted by ¼ pitch relative to each other along the measurement path.

Preferably, the additional winding arrangement of said first body incorporates at least one electrical connection; and the additional winding arrangement of said second body incorporates at least one electrical connection between said additional winding arrangement of said second body and the circuit of said second body; said at least one electrical connection of said first body being located in an area which is non-overlapping with the area in which said electrical connection of said second body is provided. This configuration further reduces errors or noise that may otherwise arise in embodiments where the electrical connections overlap one another.

Preferably, the additional winding arrangement of said first body incorporates at least one electrical connection; said electrical connection being in an area which is non-overlapping with the area of the second body's additional winding arrangement. This configuration further reduces the occurrence of noise.

Preferably, said first body further incorporates a shorted turn for separating said first arrangement of windings of said first body from said additional winding arrangement of said first body. This configuration is particularly advantageous in order to help prevent the coupling of energy from a transmit winding into receive windings in the second or additional arrangement.

Preferably, said first body further incorporates a conductive surface for separating said first arrangement of windings of said first body from said additional winding arrangement of said first body. This configuration is also particularly advantageous in order to help prevent undesirable coupling of energy.

Preferably, said first body further incorporates a magnetically permeable surface for separating said first arrangement of windings of said first body from said additional winding arrangement of said first body. This configuration is also particularly advantageous in order to help prevent undesirable coupling of energy.

Preferably, said first arrangement of windings of said first body is sufficiently separated by a distance orthogonal to the measurement path from said additional winding arrangement of said first body; whereby the extent of any orthogonal field due to the first arrangement of windings is minimised. This configuration is also particularly advantageous in order to help prevent undesirable coupling of energy.

Preferably, said first and second bodies comprise at least one printed circuit board.

Preferably, the first arrangement of windings of said first body incorporates transmit and receive windings which are electrically balanced.

Preferably, the windings of the first and second bodies are arranged substantially in a plane which is parallel to a laminar plane of material which is either electrically conductive or magnetically permeable. This configuration is particularly advantageous as it may in certain embodiments form a faraday cage effect in order to reduce the effect of external noise.

Preferably, the windings of the first and second bodies are separated from one another by an orthogonal gap which is smaller than the distance between the plane of the windings and said laminar plane of material. This configuration improves the detector's signal to noise ratio.

Preferably, an epoxy encapsulant is provided between said plane of the windings and said laminar plane of material. This configuration is particularly advantageous in being able to separate the windings from the laminar plane and in terms of being able to provide a robust structure.

Preferably, said epoxy encapsulant contains magnetically permeable particles.

Preferably, the first and second bodies are annular.

Preferably, each one of said annular bodies incorporates a plurality of segments with distinct winding arrangements in a plurality of segments. This configuration allows the detector, in certain embodiments, to operate with good measurement performance in a compact space.

In a further broad aspect, the invention provides an inductive detector arranged to measure the relative displacement of two bodies along a measurement path wherein the first body comprises a first arrangement of transmit and receive windings and a second repeating pitch arrangement of receive windings displaced from the first arrangement of windings and the second body comprises a passive resonant circuit which comprises a winding whose extent covers at least a portion of first and second winding arrangements wherein a portion of said winding varies at substantially the same pitch as the second arrangement of receive windings.

Preferably, a portion of the second body's windings is a series of loops where adjacent loops have opposite magnetic polarity.

Preferably, the first arrangement of transmit and receive windings and a second repeating pitch arrangement of receive windings displaced from each other in a direction orthogonal to the measurement axis.

Preferably, two of the receive windings in the second arrangement are shifted by ¼ pitch relative to each other along the measurement path.

Preferably, the repeating pitch arrangement of windings in the second body are arranged as loops in series whereby adjacent loops are of opposite magnetic polarity.

Preferably, the electrical connections to the first body's second arrangement of receive windings is in an area which is non-overlapping with the area in which the electrical connections are formed between the second body's first and second winding portions over the measurement scale.

Preferably, the electrical connections to the first body's second arrangement of receive windings is in an area which is non-overlapping with the area for the second body's second winding portion.

Preferably, the first and second bodies are PCBs.

Preferably, the first body's first arrangement of transmit and receive windings is electrically balanced.

Preferably, the windings are arranged substantially in a plane which is parallel to a laminar plane of material taken from the list electrically conductive, magnetically permeable.

Preferably, the orthogonal gap between the windings on first and second bodies is smaller than the gap between them and the plane of material taken from the list electrically conductive, magnetically permeable.

Preferably, the first and second winding arrangements of the first body are separated by one or more items from the list: a shorted turn; a conductive surface; a magnetically permeable surface; a distance orthogonal to the measurement path which is large relative to the extent of the transmit winding's field orthogonal to the measurement path.

Preferably, the first and second bodies are annular.

BRIEF DESCRIPTION OF THE DRAWINGS

In the accompanying drawings:—

DESCRIPTION OF THE PREFERRED EMBODIMENT

Figure 1:
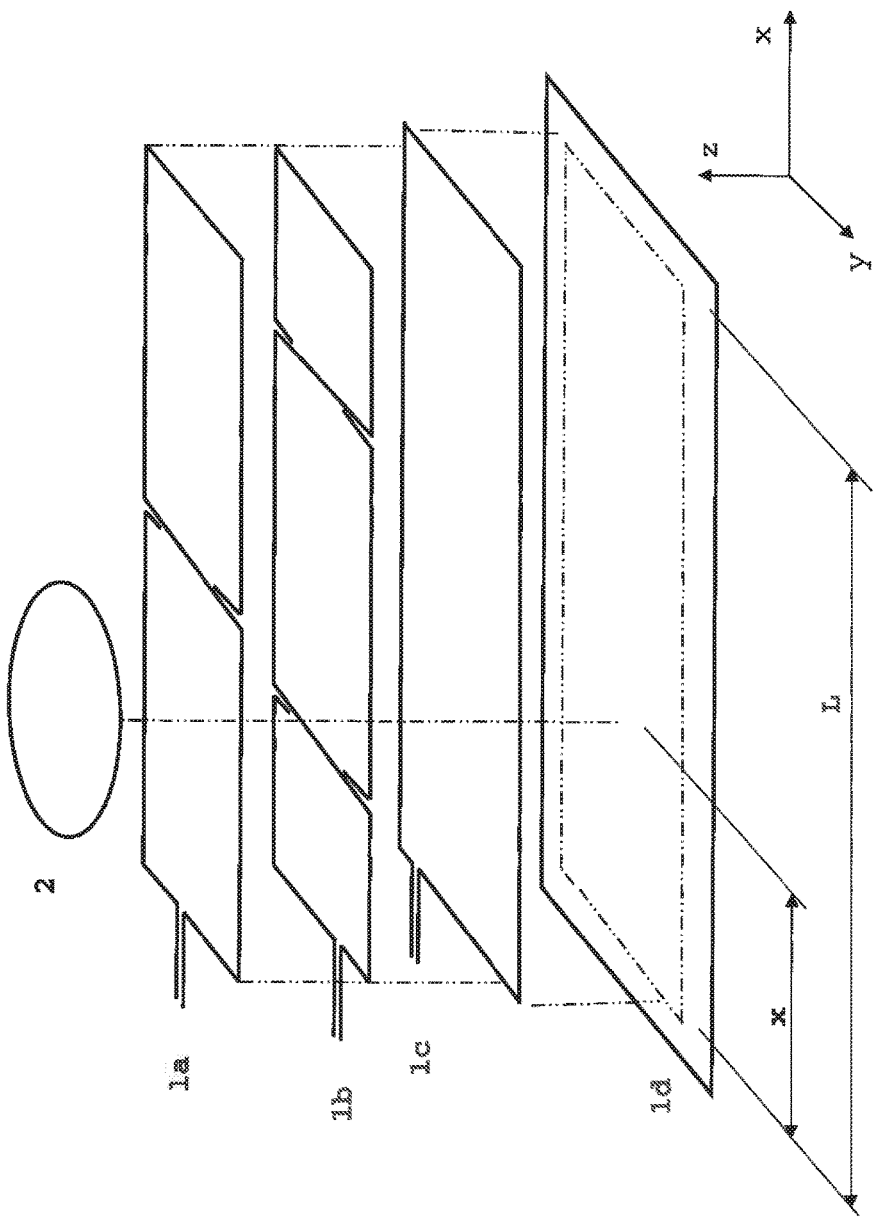
FIG. 1 shows a simplified, known form of inductive detector.

FIG. 1 shows a simplified schematic of a known form of inductive detector with an inductive target 2 which co-operates with an antenna 1. The inductive target 2 and antenna 1 are used to detect the relative displacement of the bodies which they are attached to. The bodies are arranged so as to move principally in a linear path along the (x) axis although it is important to note that such detectors are not restricted to linear motion. In certain embodiments, the path may be a circular path. The antenna 1 is electrically connected to an electronic circuit which is energised by an electrical power supply and outputs electrical data in accordance with the relative position of the inductive target 2 and antenna 1. The antenna's 1 transmit winding 1c is energised with an AC signal from the electronic circuit at substantially the same frequency as the resonant frequency of the inductive target 2. In FIG. 1 the windings are formed in a generally rectangular form but it is known that such windings may take a variety of forms such as sinusoidal, triangular, hexagonal etc. Electrical outputs from the electronic circuit can be, for example, serial data such as RS232, voltage such as 0-5 VDC or current such as 4 . . . 20 mA which are proportional to the position of the inductive target's 2 position relative to the antenna 1 along the measurement (x) axis. A power supply of 5 VDC with a current of 10 mA is typical. Preferably, the inductive target 2, antenna 1 and electronics circuit are constructed from a multi-layer printed circuit board such as 1.6 mm thick FR4 with 1 ounce copper tracking. Electrical connections between the windings or different portions of the same winding may be formed using plated through holes between different layers of the multilayer PCBs. Preferably, the printed circuit boards are protected from humidity and fluids with a sprayed conformal coating.

Figure 2:
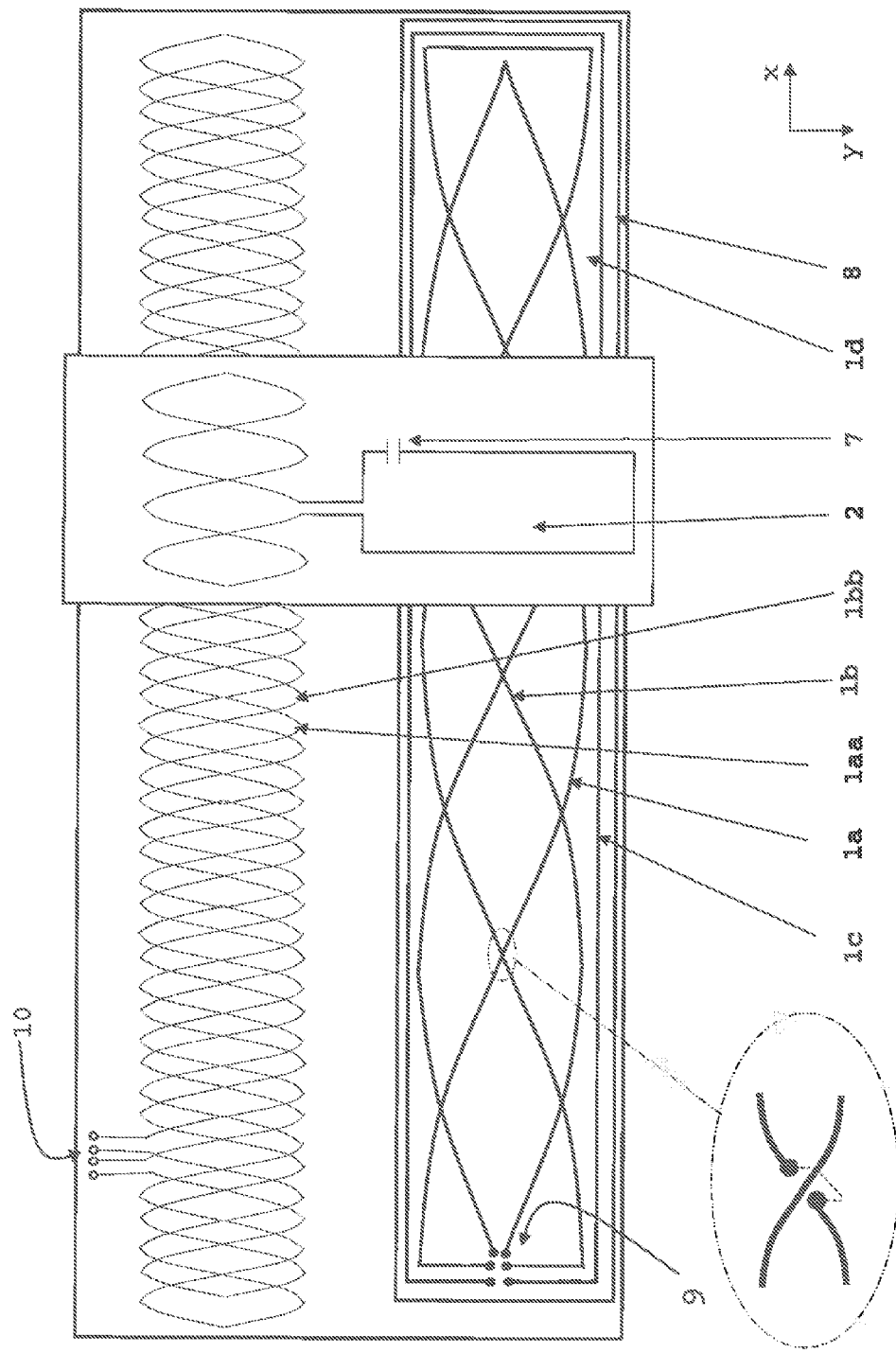
FIG. 2 shows a linear arrangement of an embodiment of the invention's windings.

FIG. 2 shows a plan view of an embodiment of the invention's windings arranged to measure, in a preferred embodiment, the relative displacement of first and second bodies along a linear measurement path (x-axis) with high accuracy. Alternative embodiments are envisaged where respective bodies are annular, curved or any other appropriate configuration of a displacement path. In preferred embodiments, the antenna and the target are both laminar. In preferred embodiments, the windings are formed by tracks on multi-layer PCBs in which cross overs are formed using plated via holes—as shown in the close-up view at the bottom left of FIG. 2. Preferably, electrical connections are provided in closely contiguous arrays in order to minimise any losses that could arise from their existence. Several such arrays may be provided as for example arrays 9 and 10 in FIG. 2. The antenna's windings are arranged in two areas—the first shown below the second. In a preferred embodiment, the antenna's windings are provided in a first arrangement of windings including windings 1a, 1b, and 1c and in a second or additional arrangement of windings including windings 1aa and 1bb. The first arrangement of windings and the additional arrangement of windings may optionally be co-planar, or substantially in the same plane. Whilst the transmit and the receive winding may be separate windings, these may alternatively be formed by a single winding operating in pulse/echo mode. The antenna's transmit winding 1c is energized with an AC signal at substantially the same resonant frequency as the inductive target 2—preferably in the range 100 kHz to 10 MHz. The transmit winding 1c forms a local electromagnetic field which couples to an inductive target 2. The inductive target 2 comprises a winding and capacitor 7 in series to form a passive resonant circuit. The target's winding has two portions (or separate winding arrangements)—a first portion which couples to the transmit winding 1c and a second portion which substantially does not inductively couple to the transmit winding 1c other than by virtue of electrical continuity to the first portion. The second portion 11 of the target's winding is arranged as a multiplicity of loops in electrical series where adjacent loops are preferably of opposite magnetic polarity. The first portion of the target's winding couples energy back into the antenna's first arrangement of receive windings 1a and 1b which are arranged in a sin and cosine arrangement, in other words phase shifted, windings along the measurement path [x-axis]. This first winding arrangement 1a, 1b and 1c is such that the ratio of the signals received into each of the receive windings 1a and 1b unambiguously indicates the relative position of the first and second bodies with relatively low resolution. The second portion of the target's winding couples energy into the antenna's second arrangement of receive windings which are arranged as a repeating pattern of sinusoidal and cosinusoidal, in other words phase shifted, windings along the measurement path. This second winding arrangement 1aa and 1bb is such that the ratio of the signals received into the receive windings ambiguously indicates the relative position of the first and second bodies with relatively high resolution. The first and second winding arrangements are displaced or spaced relative to each other in the y-axis—in other words, orthogonally to the measurement axis. They are optionally further separated electromagnetically by a shorted winding 8 which helps prevent the coupling of energy from the transmit winding 1c into the receive windings 1aa and 1bb in the second or additional arrangement. Preferably, during the relative displacement of the two bodies along the measurement path, the connection between first and second portion's of the target winding does not overlap with the electrical connections to the second arrangement of receive windings (which are shown top left in FIG. 2). Similarly, the electrical connections to the second arrangement of receive windings are placed in an area which does not overlap with the second portion of the target's windings. Such non-overlapping arrangements are advantageous in eliminating disturbances to the measurement as the first and second bodies displace. When the second body is not present, the transmit and receive windings 1a, 1b and 1c of the first body are arranged such that they are electrically balanced and therefore there is no, or at least very little, coupling between them.

The electronic circuit for this embodiment may be similar to the electronic circuits taught in the applicants' previous disclosures such as GB2427481. The power supply may pass through an over voltage protection circuit if voltage spikes are possible from the electrical supply. Reverse polarity protection is also a common requirement. Typical power requirements are 5V at 10 milliamps at a 100% duty cycle. The output signal may be produced in a variety of formats such as 0-5V, 4 . . . 20 mA or, preferably, a serial data stream such as SPI so that no errors are introduced as a result of analogue to digital conversion or vice versa. Preferably, the circuit is constructed either from an application specific integrated circuit, a hybrid circuit or a circuit of surface mount electronics soldered to the same printed circuit board as the antenna 1, preferably with a short distance between the circuit and the antenna's windings.

Since the signal in the first receive winding 1a is proportional to sin(x) and the signal in the second receive winding 1b is proportional to sin(L/4+x), which is equivalent to cos(x), then the position 'x' along the x-axis can be obtained from the equation (L/2pi)*ARC TAN(RXa/RXb). A similar approach is applied to the repeating pitch pattern windings to provide an ambiguous or incremental measurement over the winding pitch distance.

Advantageously, the electronic circuit may have a memory so that calibration of other data may be stored. Advantageously, such calibration data may be generated by a second, higher accuracy detector, such as a high-precision optical or laser system, whose readings may then be used to improve the linearity, for example, of the detector's measurements.

Modifications and Further Embodiments

Figure 3:
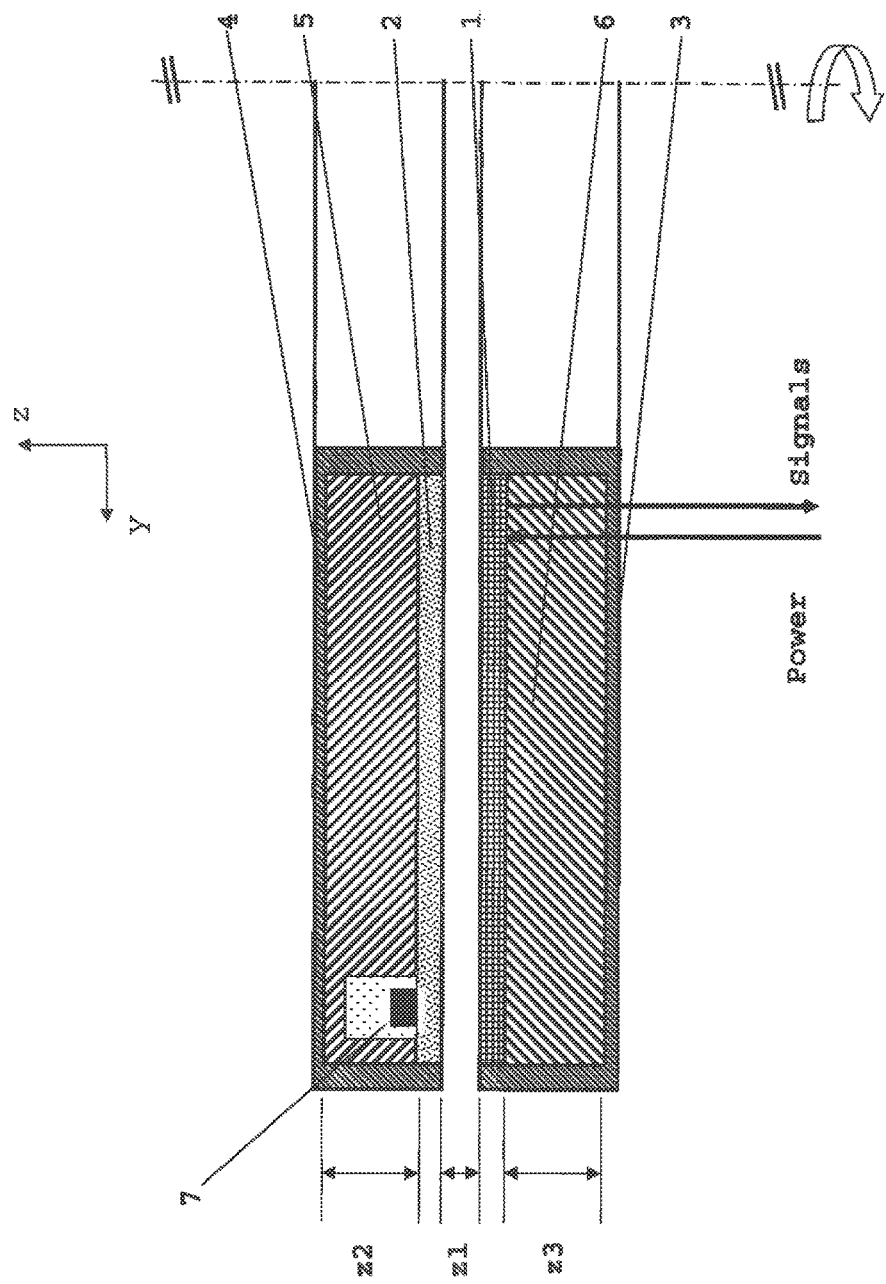
FIG. 3 shows a partial, sectional view of a rotary form of the detector in a housing.

Embodiments of the invention have particular utility for measuring shaft angle accurately and FIG. 3 shows a partial sectional view of an advantageous arrangement. In plan view, each one of the bodies may be circular or disc-shaped, or annular in shape. Preferably, the antenna 1 and target 2 are arranged as annular discs facing each other with the shaft or other elements such as electrical cables or hydraulic pipes etc., passing through their central apertures for embodiments where such an aperture is envisaged. In such arrangements, it is advantageous to secure the target and antenna into metal housings for purposes of mechanical protection, mechanical connection to adjacent components and to provide some electromagnetic protection in noisy environments. In order that the metal housings do not interfere with the inductive sensor; the separation distance z1 between target 2 and antenna 1 is smaller than the distance z2 between antenna 1 and its housing 3 and smaller than the distance z3 between target 2 and its housing 4. Preferably the gap between housings 3 and 4 and the corresponding antenna 1 and target 2 is filled with epoxy encapsulant 6 and 5. Such epoxy encapsulants may also be loaded with magnetically permeable material such as ferrite particles in order to provide a material which absorbs or screens electromagnetic energy.

FIG. 2 shows an arrangement in which the receive windings of the second arrangement share a common centre line. This is advantageous in minimizing measurement errors from offsets, mechanical installation tolerances or relative displacements between the two bodies in axes other than the measurement axis. However, when the areas of the sine and cosine windings, with a common centre-line, overlap then a large number of plated via holes is required as well as a multiplicity of PCB layers. Such a construction impacts measurement performance for various reasons including the imperfections due to the via holes and the varying distance between different parts of the target and antenna windings.

Figure 4:
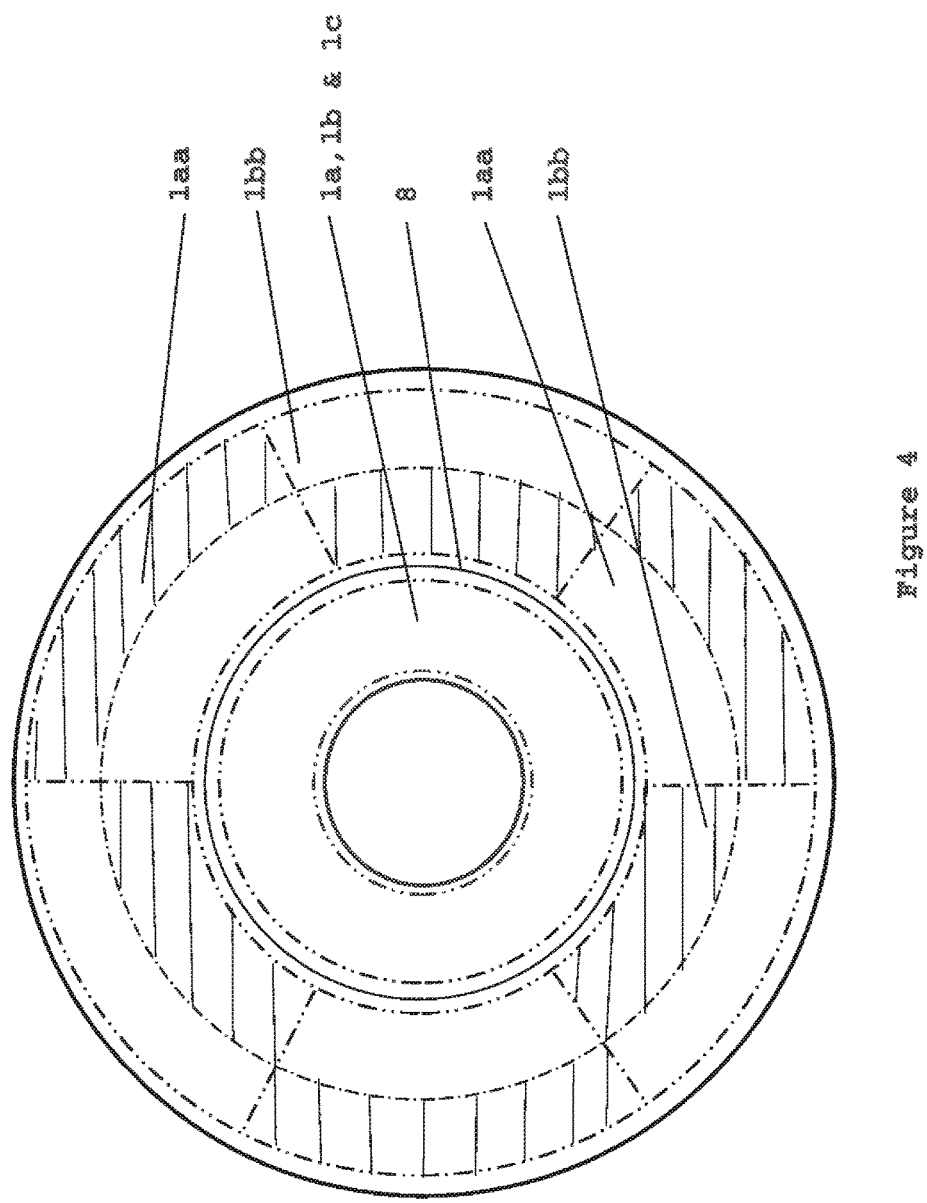
FIG. 4 shows an annular arrangement of an embodiment of the invention's windings.

FIG. 4 shows an antenna winding arrangement in which the second arrangement of receive windings 1aa and 1bb share a common centre line but limits the number of PCB layers and plated via holes. This is achieved by not overlapping the areas which the sine and cosine windings occupy and instead each of the windings occupies preferably three or more segments in which there are one or more loops while preferably maintaining electrical continuity between the segments of the windings.

Thus far, arrangements have been described with two portions of windings—the first portion being arranged as coarse windings and the second portion arranged as finer pitch, repeating windings. In a further embodiment, the first portion may contain fine and coarse windings with the second portion containing yet finer pitch windings.

In a further embodiment the first and second winding arrangements may be arranged as a Vernier pair. For example, the first arrangement may have 27 pitches and the other winding 28 so that absolute position measurement may be maintained up to the lowest common multiple.

The shape of the width variation of the circuits on any of the windings need not be sinusoidal. The width variation may be rectangular, triangular, circular or other such shape.

Other higher harmonic components may be added to the sinusoidally varying part of the inductive target or antenna windings to improve linearity. This may be necessary, for example, to account for the disturbing effect of a metal part in the detector's near field or to accommodate the geometry of nested loops which are formed by multiple turns per winding pitch.

The antenna's transmit and receive windings may be simplified when an embodiment of the invention is used in a pulse echo mode. In this mode the windings are first of all energised with an AC signal which is then switched off to allow the windings then to receive any signals coming back from a resonating inductive target. Only 2 windings, with known separation, are required and there is no requirement necessarily for electrical balancing. In such instances the windings act as both transmit and receive windings.

In some safety related or high reliability applications then the detector may be constructed with self checking hardware and software. Not only can the electronic circuit's software contain the traditional techniques associated with checking for open circuits, out of bounds measurements etc. but a further inductive target may be used. This may be fixed relative to the antenna or target. Preferably, this second target should have a different resonant frequency than the first target. In this way, a self-diagnostic check may be carried out by measuring the position of the second inductive target. If the second target appears to have moved from its known position past predefined limits then this may be taken as a fault and an alarm or corrective action taken accordingly.

In order to maximise received signal strength and hence maximise the signal:noise ratio the electronics circuit should preferably include a frequency tuning circuit so that the exact resonant frequency of the inductive target 2 or devices may be used as the transmit frequency. In this way a maximum amount of transmitted energy goes into producing electrical resonance of the inductive target 2 and, in turn, the inductive target 2 produces maximum electromagnetic signal.

Preferably, any material present between the inductive target 2 and antenna 1 is an insulator such as plastic, ceramic or wood. In certain embodiments, a metal barrier may be placed between them so long as the excitation or resonant frequency is sufficiently low to permit the signals to carry through the metal's skin depth. If a metal barrier is essential then preferably the metal has a relatively low magnetic permeability such as non-magnetic stainless steel (e.g. 316 grade stainless). A frequency of 40 kHz is, for example, sufficient to permit the transmission of signals through 1 mm thick, non-magnetic 316 grade stainless steel sheet.

Thus far the antenna 1 has been described with co-planar transmit and receive windings. This is preferable but not necessary.

For most applications the effect of extreme or changing temperatures will have negligible effect on measurement performance. In some applications, however, very high accuracy measurement is required even though the operating temperature range or variation rate may be extreme. In such instances, the relatively small expansion or contraction of the antenna 1 or target 2 may lead to measurement errors. Such temperature effects may be counteracted by measuring the actual operating temperature and modifying the measured position accordingly, i.e. reducing or increasing the measured value according to the temperature. Temperature can be measured using a thermocouple or resistance device but preferably the resistance of one or more of the antenna windings such as 1a, 1b, 1c may be used to provide an indication of temperature. Measurement of the winding resistance is preferable to measurement by a thermocouple because the windings provide a more representative measurement due to their position along the measurement axis (rather than being constrained to a single point as with a thermocouple). Similarly, the amplitude of the signal received from the target 2 or its Q-factor can be taken as generally proportional to its winding resistance and hence indicative of temperature such that the appropriate corrections may be made.

The invention claimed is:

1. An inductive position detector with a first and a second body which are displaceable relative to one another along a measurement path
   wherein said first body comprises:
   at least first and second antenna winding arrangements, each of said antenna winding arrangements defining a plurality of adjacent receive winding loops extending in the direction of the measurement path,
   and wherein said second body comprises:
   a passive resonant circuit incorporating at least first and second target winding arrangements in series with a capacitor, said second target winding arrangement defining a plurality of adjacent winding loops extending in the direction of the measurement path; said first and second antenna winding arrangements and said first and second target winding arrangements both being spaced apart orthogonally of said measurement path so as to be separate, and said first and second bodies being disposed so that first and second target winding arrangements cover at least a part of first and second antenna winding arrangements respectively;

wherein said first antenna winding arrangement further includes a transmit winding, said transmit winding being solely part of said first antenna winding arrangement;

said second antenna winding arrangement being located outside of said first antenna winding arrangement and orthogonally spaced apart from said transmit winding of said first antenna winding arrangement;

the receive winding loops of said first antenna winding arrangement are of coarser pitch relative to those of the second antenna winding arrangement, and the polarities of both adjacent receive winding loops of said second antenna winding arrangement and adjacent winding loops of said second target winding arrangement are magnetically opposite.

2. An inductive position detector according to claim 1, wherein the second antenna winding arrangement of said first body and the second target winding arrangement of said second body vary at substantially the same pitch.

3. An inductive position detector according to claim 1, wherein the second antenna winding arrangement of said first body incorporates at least a first series of adjacent receive winding loops and a second series of adjacent receive winding loops which overlap one another and are shifted by ¼ pitch relative to each other along the measurement path.

4. An inductive position detector according to claim 1, wherein the second antenna winding arrangement of the first body incorporates at least one electrical connection; and the second target winding arrangement of said second body incorporates at least one electrical connection with the first target winding arrangement; said at least one electrical connection of said first body being located in an area which is non-overlapping with the area in which said electrical connection of said second body is provided.

5. An inductive position detector according to claim 1, wherein the second antenna winding arrangement of said first body incorporates at least one electrical connection; said electrical connection being in an area which is non-overlapping with the area of the second target winding arrangement of the second body.

6. An inductive position detector according to claim 1, wherein said first body further incorporates a shorted turn for separating the first antenna winding arrangement of said first body from the second antenna winding arrangement thereof.

7. An inductive position detector according to claim 1, wherein said first body further incorporates a conductive surface for separating the first antenna winding arrangement of said first body from the second antenna winding arrangement thereof.

8. An inductive position detector according to claim 1, wherein said first body further incorporates a magnetically permeable surface for separating the first antenna winding arrangement of said first body from the second antenna winding arrangement thereof.

9. An inductive position detector according to claim 1, wherein the first antenna winding arrangement of said first body is separated from the second antenna winding arrangement thereof by a distance orthogonal to the measurement path which is large relative to the extent of the transmit winding's magnetic field orthogonal to the measurement path.

10. An inductive position detector according to claim 1, wherein the first and second bodies comprise at least one printed circuit board.

11. An inductive position detector according to claim 1, wherein the transmit and receive windings of the first antenna winding arrangement are electrically balanced.

12. An inductive position detector according to claim 1, wherein the winding arrangements of the first and second bodies are arranged substantially in a plane which is parallel to a laminar plane of material which is either electrically conductive or magnetically permeable.

13. An inductive position detector according to claim 12, wherein the first and second antenna winding arrangements of the first body and the first and second target winding arrangements of the second body are separated from one another by an orthogonal gap which is smaller than the distance between the plane of the windings and said laminar plane of material.

14. An inductive position detector according to claim 12, wherein an epoxy encapsulant is provided between said plane of the winding arrangements and said laminar plane of material.

15. An inductive position detector according to claim 14, wherein said epoxy encapsulant contains magnetically permeable particles.

16. An inductive position detector according to claim 1, wherein the first and second bodies are annular.

17. An inductive position detector according to claim 16, wherein each one of said annular bodies incorporates a plurality of segments with distinct winding arrangements in a plurality of segments.

* * * * *